Patented May 1, 1934

1,956,570

UNITED STATES PATENT OFFICE 1,956,570

PROCESS OF RECOVERING RESORCINOL

Claude Henri Gallay, Roussillon, France, assignor to Société des Usines Chimiques Rhône-Poulenc, Paris, France No Drawing. Application August 15, 1931, Serial No. 557,369

9 Claims. (Cl. 260—154)

This invention relates to an improvement in the process of preparing resorcinol by the caustic fusion of a benzene-disulfonic-acid compound. It is an object of this invention to improve the general process of preparing resorcinol, whereby to obtain the latter in a high degree of purity free of by-product mercapto bodies.

Resorcinol is generally prepared by fusing with caustic soda the sodium salt of benzene-m-disulfonic acid or a mixture of said m-salt with the corresponding p- or o-salts to produce a mixture of sodium resorcinate, sodium sulfite, and excess sodium hydroxide; dissolving the resorcinate in water, acidifying the solution to convert the resorcinate into the free phenolic form, and extracting the latter by an organic solvent such as ether. It has been my observation that when the above procedure is followed as outlined, the resultant resorcinol has an objectionable odor and tends to assume a dark color upon standing, evidently due to certain impurities contained therein, which are not removed even by the subsequent vacuum distillation step generally practiced in the art. Further investigation has convinced me that much of this darkening is apparently caused by the presence of mercaptans such as thioresorcinol or metamercapto-phenol. Just how these compounds are formed in the reaction is not very clearly understood. It has been suggested in the analogous case of caustic fusion of benzol-monosulfonic acid (sodium salt) to give phenol, that thiophenol is formed by the reducing action of the sodium sulfite formed at the earlier stages of the reaction upon the benzene-sulfonic acid (sodium salt) which still remained unattacked at this stage. However, whatever the theory for their formation, I have found that these objectionable impurities can be effectively and economically removed by precipitation with a heavy metal from the aqueous solution of the fusion mass, either before or after neutralization. More particularly, I found that if a copper compound, for instance copper sulfate, be added to the aqueous solution of the fusion mass, said objectionable impurities precipitate, evidently in the form of their copper salts, and may be eliminated from the mass by a simple filtration step. The filtrate may now be treated in the usual manner for the recovery of resorcinol.

The following specific example will serve further to illustrate my invention, without, however, limiting the same.

Example 1

A caustic fusion mass containing sodium resorcinate, sodium sulfite and sodium hydroxide, as obtainable in the well known process of preparing resorcinol by fusing benzene-disulfonic acid with caustic soda is dissolved in water and neutralized with sulfuric acid until neutral to phenolphthalein. The mass now contains the resorcinol and thioresorcinol bodies in free acid form, but contains no free mineral acid.

Into about 1000 parts by volume of the neutral aqueous mass, containing about 100 parts by weight of resorcinol and maintained at a temperature of about 35 to 40° C., there are now added 4 parts of a copper sulfate solution containing about 10% by weight of $CuSO_4.5H_2O$ and the entire mass is stirred for about 3 hours and filtered. The precipitate consists largely of the copper salt of thioresorcinol, while the filtrate contains resorcinol, sodium sulfite and sodium sulfate, and may be further treated for isolation of the resorcinol in any of the well known manners, for instance by extraction with ether.

It will be understood, of course, that many variations are possible in my preferred procedure without departing from the spirit of this invention. For instance, if desired, the copper compound may be added to the aqueous solution of the fusion mass before the latter is neutralized with acid, and the filtration step may be then carried out either before or after neutralization. Instead of precipitating the impurities with copper sulfate, other copper salts may be used. Moreover, the precipitant need not necessarily be a copper compound, but may be a mercury, lead, or any other derivative whose salt with thioresorcinol is insoluble in water. The test for the suitability of a given salt or oxide as a precipitant is whether or not the metal of this compound forms with thioresorcinol a compound insoluble in water. Since thioresorcinol can be obtained directly by other methods of synthesis, it follows that this test can be readily performed without recourse to the resorcinol synthesis procedure.

My process may also be applied to the purification of resorcinol in bulk form as it is obtained on the market. It is merely necessary to dissolve the resorcinol in water add thereto a compound of the above type, for instance copper sulfate, and filter off or settle out any precipitate formed.

Example 2

100 parts of crude or technical resorcinol are dissolved in 400 parts of water and an aqueous solution of $CuSO_4$ containing 10% by weight of $CuSO_4.5H_2O$ is added gradually until a test sample shows no further precipitation with additional CuSO₄. With an average sample this may require from 4 to 8 parts of said solution. The mass is stirred for some time and filtered. The filtrate contains resorcinol free from the thio compounds, and may be treated to recover the resorcinol in solid form in any well known manner, such as evaporation, or extraction with ether and evaporation of the extract.

Many other variations may be introduced into our process without departing from the spirit of this invention.

In the claims below it should be understood that by the term "a water-soluble resorcinol body" I am referring to a compound of the group consisting of resorcinol and its water-soluble salts.

I claim:

1. The process of purifying a water-soluble resorcinol body from by-product mercapto bodies, which comprises adding to an aqueous solution of said body a compound of a metal whose salt with thioresorcinol is less soluble in water than the compound itself, and separating the precipitate.

2. The process of purifying resorcinol from by-product mercapto bodies, which comprises adding to an aqueous solution of the same a copper compound which is more soluble in water than the copper salt of thioresorcinol, and separating the precipitate.

3. The process of purifying resorcinol from by-product mercapto bodies, which comprises adding to an aqueous solution of the same a water soluble copper salt and separating the precipitate.

4. The process of purifying resorcinol from by-product mercapto bodies, which comprises adding to an aqueous solution of the same copper sulfate and separating the precipitate.

5. In the process of preparing resorcinol by the caustic fusion of a salt of benzene-disulfonic acid, and subsequently dissolving the fusion mass in water and treating the same further to recover resorcinol, the step which comprises adding to said aqueous solution a compound of a metal whose salt with thioresorcinol is less soluble in water than the compound itself, and separating the precipitate.

6. In the process of preparing resorcinol by the caustic fusion of a salt of benzene-disulfonic acid, and subsequently dissolving the fusion mass in water and treating the same further to recover resorcinol, the step which comprises adding to said aqueous solution a copper compound which is more soluble in water than the copper salt of thioresorcinol, and separating the precipitate.

7. In the process of preparing resorcinol by the caustic fusion of a salt of benzene-disulfonic acid, and subsequently dissolving the fusion mass in water and treating the same further to recover resorcinol, the step which comprises adding to said aqueous solution a water soluble copper salt, and separating the precipitate.

8. In the process of preparing resorcinol by the caustic fusion of a salt of benzene-disulfonic acid, and subsequently dissolving the fusion mass in water and treating the same further to recover resorcinol, the step which comprises adding to said aqueous solution copper sulfate, and separating the precipitate.

9. In the process of preparing resorcinol by the caustic fusion of a salt of benzene-disulfonic acid, the steps which comprise dissolving the fusion mass in water, neutralizing the same with acid, adding copper sulfate to the neutralized solution, and separating the precipitate from the solution.

CLAUDE HENRI GALLAY.